US012206680B2

(12) United States Patent
Lee et al.

(10) Patent No.: US 12,206,680 B2
(45) Date of Patent: Jan. 21, 2025

(54) INCORPORATING NETWORK POLICIES IN KEY GENERATION

(71) Applicant: QUALCOMM Incorporated, San Diego, CA (US)

(72) Inventors: Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/499,713

(22) Filed: Nov. 1, 2023

(65) Prior Publication Data

US 2024/0064154 A1    Feb. 22, 2024

Related U.S. Application Data

(63) Continuation of application No. 16/146,709, filed on Sep. 28, 2018, now Pat. No. 11,831,655.
(Continued)

(51) Int. Cl.
*H04L 29/06* (2006.01)
*H04L 9/40* (2022.01)
*H04W 12/04* (2021.01)
*H04W 12/10* (2021.01)
*H04W 76/10* (2018.01)

(52) U.S. Cl.
CPC .......... *H04L 63/123* (2013.01); *H04L 63/062* (2013.01); *H04L 63/20* (2013.01); *H04W 12/04* (2013.01); *H04W 12/10* (2013.01); *H04W 76/10* (2018.02); *H04L 63/1466* (2013.01)

(58) Field of Classification Search
None
See application file for complete search history.

(56) References Cited

U.S. PATENT DOCUMENTS 10,057,053 B2 * 8/2018 Campagna ............ H04L 9/0866
10,219,292 B2   2/2019 Damnjanovic et al.
(Continued)

FOREIGN PATENT DOCUMENTS

AU    2017216479 A1    8/2017
CO       5680123 A1    9/2006
(Continued)

OTHER PUBLICATIONS

Chen, Fatang; Yuan, Jinlong. Enhanced Key Derivation Function of HMAC-SHA-256 Algorithm in LTE Network. 2012 Fourth International Conference on Multimedia Information Networking and Security. https://ieeexplore.ieee.org/stamp/stamp.jsp?tp=&arnumber=6405620 (Year: 2012).*

(Continued)

*Primary Examiner* — Jeremiah L Avery
(74) *Attorney, Agent, or Firm* — Patterson+ Sheridan, L.L.P.

(57) ABSTRACT

The present disclosure provides techniques that may be applied, for example, for providing network policy information in a secure manner. In some cases, a UE may receive a first message for establishing a secure connection with a network, wherein the first message comprises network policy information, generate a first key based in part on the network policy information, and use the first key to verify the network policy information.

28 Claims, 14 Drawing Sheets

Related U.S. Application Data

(60) Provisional application No. 62/567,086, filed on Oct. 2, 2017.

(56) References Cited

U.S. PATENT DOCUMENTS

| | | | |
|---|---|---|---|
| 10,984,128 | B1 | 4/2021 | Hoffer |
| 2010/0306076 | A1 | 12/2010 | Taveau et al. |
| 2011/0255691 | A1 | 10/2011 | Escott et al. |
| 2015/0104017 | A1* | 4/2015 | Halford ............... H04W 12/041 380/270 |
| 2015/0312819 | A1 | 10/2015 | Yang et al. |
| 2017/0079059 | A1 | 3/2017 | Li et al. |
| 2017/0324652 | A1 | 11/2017 | Lee et al. |
| 2018/0013568 | A1* | 1/2018 | Muhanna ............... H04L 9/0822 |
| 2018/0062847 | A1* | 3/2018 | Mildh ................. H04W 12/033 |
| 2018/0109538 | A1* | 4/2018 | Kumar .................... H04L 63/08 |
| 2018/0367303 | A1 | 12/2018 | Velev et al. |
| 2019/0104134 | A1 | 4/2019 | Lee et al. |
| 2021/0153010 | A1 | 5/2021 | Torvinen et al. |

FOREIGN PATENT DOCUMENTS

| | | |
|---|---|---|
| TW | 201404191 A | 1/2014 |
| WO | 2011130684 A1 | 10/2011 |
| WO | 2014109283 A1 | 7/2014 |
| WO | 2016064544 A1 | 4/2016 |
| WO | 2017142362 A1 | 8/2017 |

OTHER PUBLICATIONS

Chen, Yi-Ruei; Tzeng, Wen-Guey. Efficient and Provably-Secure Group Key Management Scheme Using Key Derivation. 12 IEEE 11th International Conference on Trust, Security and Privacy in Computing and Communications. https://ieeexplore.ieee.org/stamp/stamp.jsp?tp=&arnumber=6295988 (Year: 2012).*

Kukreja, Deepika et al. Security enhancement by detection and penalization of malicious nodes in wireless networks. 2014 International Conference on Signal Processing and Integrated Networks (SPIN). https://ieeexplore.ieee.org/stamp/stamp.jsp?tp=& arnumber=6776962 (Year: 2014).*

Barskar, Raju et al. Secure key management in vehicular ad-hoc network: A review. 2016 International Conference on Signal Processing, Communication, Power and Embedded System (SCOPES). https://ieeexplore.ieee.org/stamp/stamp.jsp?tp=&arnumber=7955730 (Year: 2016).*

Fu, Anmin et al. EKMP: An enhanced key management protocol for IEEE 802.16m. 2011 IEEE Wireless Communications and Networking Conference. https://ieeexplore.ieee.org/stamp/stamp.jsp?tp=&arnumber=5779291 (Year: 2011).*

3GPP TR 33.899: "3rd Generation Partnership Project; Technical Specification Group Services and System Aspects; Study on the Security Aspects of the Next Generation System (Release 14)", 3GPP Standard; S3-172095, Technical Report; 3GPP TR 33.899 V1.3.0 (Aug. 2017), 3rd Generation Partnership Project, Mobile Competence Centre; 650, Route Des Lucioles; F-06921 Sophia-Antipolis Cedex; France, vol. SA WG3, No. v1.3.0, Aug. 21, 2017, 605 pages, XP051336126, XP051450230, the whole document.

3GPP TS 33.401: "3rd Generation Partnership Project; Technical Specification Group Services and System Aspects; 3GPP System Architecture Evolution (SAE); Security architecture (Release 9)", 3GPP standard; 3rd Generation Partnership Project (3GPP), Mobile Competence Centre; 650, Route Des Lucioles; F-06921 Sophia-Antipolis Cedex; France, No. V9.3.1, Apr. 14, 2010 (Apr. 14, 2010), pp. 1-104, XP050402537, [retrieved on Apr. 14, 2010] p. 29, line 1-p. 33, line 38 figures 6.2-1.

3GPP TS 33.501: "3rd Generation Partnership Project; Technical Specification Group Services and System Aspects; Security Architecture and Procedures for 5G System (Release 15)", 3GPP Draft; S31170316 33501, 3GPP TS 33.501 V0.3.0 (Aug. 2017), for LI Discussion, 3rd Generation Partnership Project (3GPP), Mobile Competence Centre; 650, Route Des Lucioles; F-06921 Sophia-Antipolis Cedex; France, Sep. 27, 2017, XP051361258, pp. 1-45.

802.15.6-2012—IEEE Standard for Local and Metropolitan Area Networks—Part 15.6: Wireless Body Area Networks. https://ieeexplore.ieee.org/starnp/starnp.jsp?tp=arnurnber=6161600 (Year: 2012).

Badra M., et al., "Key-Exchange Authentication using Shared Secrets", Computer, vol. 39, Issue. 3, 2006, pp. 58-66.

Dohndorf O., et al., "Lightweight Policy-Based Management of Quality-Assured, Device-Based Service Systems", 2010 IEEE 24th International Conference on Advanced Information Networking and Applications Workshops, 2010, pp. 526-531.

Huawei, et al., "Solution for IMSI Privacy While Meeting LI Requirements", 3GPP TSG SA WG3 #87, S3-171510, Ljubljana, Slovenia, May 19, 2017, 4 Pages, May 15, 2017-May 19, 2017, searched on [Aug. 16, 2022].

International Preliminary Report on Patentability—PCT/US2018/053661, The International Bureau of WIPO—Geneva, Switzerland, Apr. 16, 2020.

International Search Report and Written Opinion—PCT/US2018/053661—ISA/EPO—Jan. 16, 2019.

Law Y.W., et al., "Secure k-Connectivity Properties of Wireless Sensor Networks", 2007 IEEE International Conference on Mobile Adhoc and Sensor Systems, 2007, 6 Pages.

Ma Z., et al., "Provably Secure Trusted Access Protocol for WLAN Mesh Networks", 2008 IEEE/IFIP International Conference on Embedded and Ubiquitous Computing, 2008, pp. 43-48.

NCSC (CESG): "[MCSEC] Temporary Group Call Security Solution—add Group Call User", S3-170316, 3GPP TSG SA WG3 (Security) Meeting #86, Feb. 6-10, 2017, Sophia Antipolis, France, 4 Pages.

Nec et al., "Improve and Clarify Texts under Note", 3GPP TSG-SA WG3 Meeting #89, S3-17xyza, CR CRNum, V14.4.0, Reno, Nevada USA, Nov. 27-Dec. 1, 2017, 3 Pages.

Nec et al., "pCR to TR 33.899: Update of Solution #1.32", 3GPP TSG SA WG3 (Security) Meeting #87, S3-171177, May 15-19, 2017, Ljubljana, 4 Pages.

Oberoi, et al., "Wearable security: Key Derivation for Body Area Sensor Networks Based on Host Movement", 2016 IEEE 25th International Symposium on Industrial Electronics (ISIE), https://ieeexplore.ieee.org/starnp/starnp.jsp?tp=arnurnber=7745050 (Year: 2016).

Qualcomm Incorporated: "pCR to Provide a Normative Text for the AMF Key Derivation/Refresh", 3GPP TSG SA WG3 (Security) Meeting #88, Dali, China, S3-172010, Aug. 11, 2017, 2 Pages, Aug. 7, 2017-Aug. 11, 2017, searched on [Aug. 16, 2022].

Qualcomm Incorporated: "pCR to Provide a Normative Text for the AMF Key Derivation/Refresh", 3GPP TSG SA WG3 (Security) Meeting #88Bis Adhoc, S3-172387, Singapore, Oct. 9, 2017-Oct. 13, 2017, 3 Pages, Oct. 2, 2017, searched on [Aug. 16, 2022].

Qualcomm Incorporated: "Some Corrections and Clarification to the Authentication Text", 3GPP TSG SA WG3 (Security) Meeting #88, S3-172145, Dali, China, Aug. 11, 2017, 6 Pages, Aug. 7, 2017-Aug. 11, 2017, searched on [Aug. 16, 2022].

Taiwan Search Report—TW107134619—TIPO—Jan. 4, 2022.

Thatmann D., et al., "A Secure DHT-Based Key Distribution System for Attribute-Based Encryption and Decryption", 2015 9th International Conference on Signal Processing and Communication Systems (ICSPCS), 2015, 9 pages.

Wang H-M., et al., "Physical Layer Security in Heterogeneous Cellular Networks", IEEE Transactions on Communications, vol. 64, Issue. 3, 2016, pp. 1-16.

Zte, et al., "Key Hierarchy for 5G", 3GPP Draft; S3-171605, 3GPP TSG SA WG3 (Security) Meeting #87, Key Hierarchy for 5G, 3rd Generation Partnership Project (3GPP), Mobile Competence Centre; 650, Route Des Lucioles; F-06921 Sophia-Antipolis Cedex; France, vol. SA WG3, No. Ljubljana, Slovenia; May 15, 2017-May 19, 2017, Jun. 5, 2017, XP051289781, 7 pages.

ZTE: "Update of Solution 8.5", 3GPP Draft; S3-171053, 3GPP TSG SA WG3 (Security) Meeting #87, Update of Solution 8.5, 3rd Generation Partnership Project (3GPP), Mobile Competence Centre; 650, Route Des Lucioles; F-06921 Sophia-Antipolis Cedex;

(56) References Cited

OTHER PUBLICATIONS

France, vol. SA WG3, No. Ljubljana, Slovenia; May 15, 2017-May 19, 2017, May 14, 2017, XP051282555, 5 pages.

* cited by examiner

INCORPORATING NETWORK POLICIES IN KEY GENERATION

CLAIM OF PRIORITY UNDER 35 U.S.C. § 119

This application is a continuation of U.S. patent application Ser. No. 16/146,709, filed Sep. 28, 2018, which claims the benefit of U.S. Provisional Patent Application Ser. No. 62/567,086, filed Oct. 2, 2017, which is herein incorporated by reference in its entirety.

FIELD OF THE DISCLOSURE

Certain aspects of the present disclosure generally relate to wireless communications and, more particularly, to methods and apparatus for establishing secure communications in a network.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide a method for wireless communications by a user equipment (UE). The method generally includes receiving a first message for establishing a secure connection with a network, wherein the first message includes network policy information. The method also includes generating a first key based in part on the network policy information. The method further includes using the first key to verify the network information.

Certain aspects of the present disclosure provide a method for wireless communications by a network node, such as a security anchor function (SEAF). The method generally includes generating a key for a network node based at least in part on network policy information. The key is used for establishing a secure connection between a UE and the network node. The method also includes sending the key to the network node.

Certain aspects of the present disclosure provide a method for wireless communications by a user equipment (UE). The method generally includes establishing, based on an authentication procedure with a network, an anchor key that is shared between the UE and a security anchor function (SEAF) in the network. The method also includes receiving a first message for establishing a secure connection with the network, wherein the first message comprises a network policy token for a communication session with the network, network policy information, a first amount of time that a first key is valid and a second amount of time that the network policy token is valid. The method further includes determining whether the network policy token is valid based on a key derived from the shared anchor key, the network policy information, the first amount of time and the second amount of time, prior to establishing the secure connection with the network.

Certain aspects of the present disclosure provide a method for wireless communications by a network node, such as a security anchor function (SEAF). The method generally includes establishing, based on an authentication procedure with a UE, an anchor key that is shared between the SEAF and the UE in a network. The method also includes generating a network policy token based in part on the anchor key, network policy information and a first amount of time that the network policy token is valid. The method further includes generating a key for another network node, and sending the key, the network policy information and the network policy token to the other network node.

Numerous other aspects are provided including methods, apparatus, systems, computer program products, and processing systems capable of performing the operations described above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
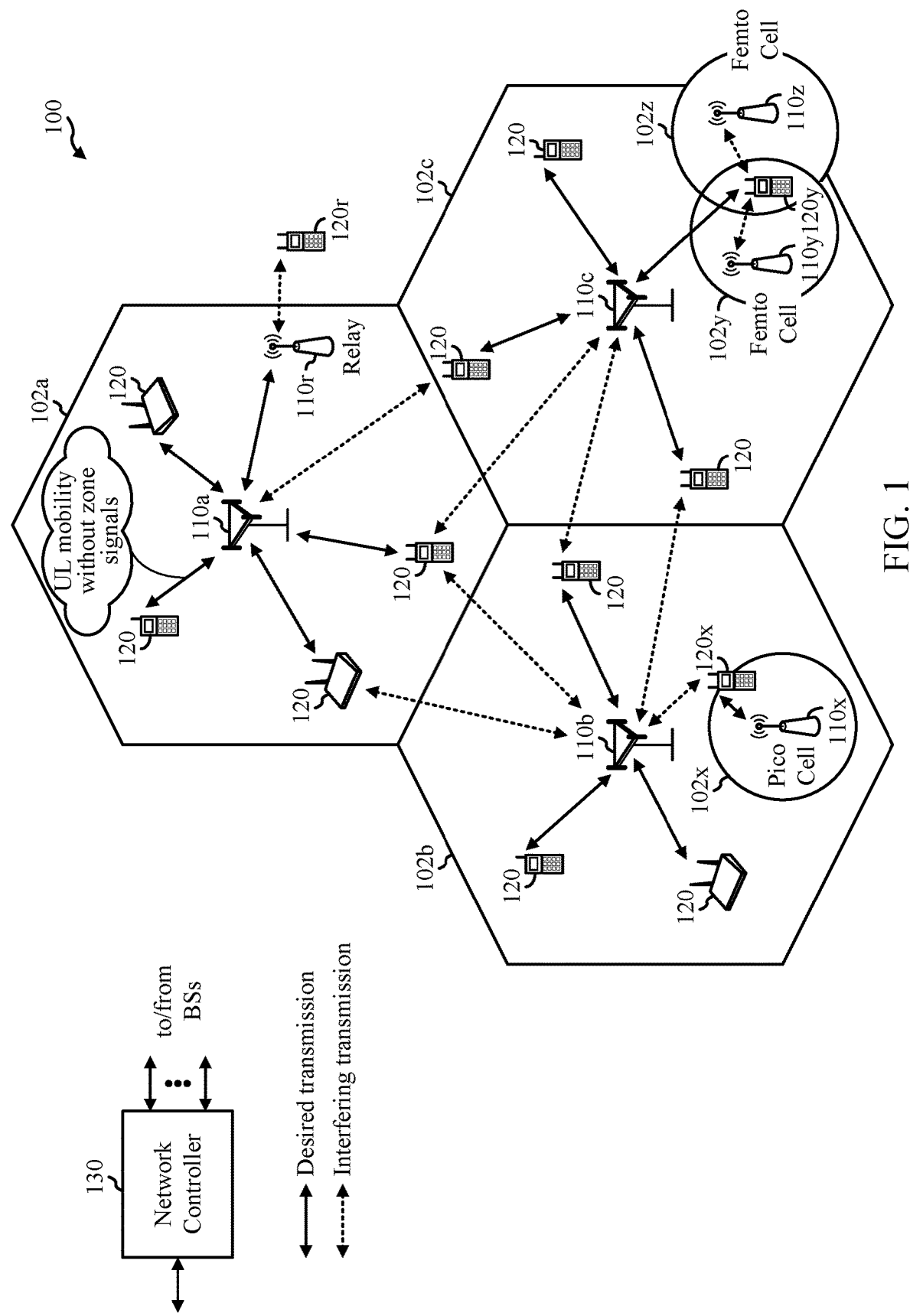
FIG. 1 is a block diagram conceptually illustrating an example telecommunications system, in accordance with certain aspects of the present disclosure.

Aspects of the present disclosure provide apparatus, methods, processing systems, and computer readable mediums for wireless networks, such as new radio (NR) (new radio access technology or 5G technology) wireless networks.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

In some aspects, a 5G NR system may be able to support various different deployment scenarios. Particularly, as 5G technology and/or service requirements continue to evolve, the services, capabilities and/or functions performed by one or more network nodes in a 5G network can vary. As changes in the network architecture may not be known to the UE, it may be beneficial to inform the UE as to the particular network configuration, capabilities, security configuration, etc. However, it may not be possible using current techniques for the network to inform the UE as to the network (security) configuration, capabilities, and policies in a secure manner.

For example, in a 5G system, there is typically a single control-plane interface (N1) between the UE and the serving network. This N1 interface is generally used for establishing a non-access stratum (NAS) connection between the UE and access and mobility management function (AMF) AMF. However, in some deployment scenarios, the AMF may not be responsible for (or have access to) security functions in the network. Thus, as the AMF may be the only entity that has a signaling connection with the UE, there may be cases in which a (rogue or malicious) AMF can intercept network configuration information and modify the network configuration information provided to the UE to compromise the connection/communication between the UE and the network. Accordingly, aspects of the present disclosure provide techniques for securely informing the UE as to the network (security) configuration, capabilities, network policies, etc.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

Example Wireless Communications System

FIG. 1 illustrates an example wireless network 100, such as a new radio (NR) or 5G network, in which aspects of the present disclosure may be performed, for example, for securely providing a UE network (security) policy information (e.g., network configuration, security information, capabilities, etc.). In some cases, the network 100 may be a multi-slice network, where each slice defines as a composition of adequately configured network functions, network applications, and underlying cloud infrastructures that are bundled together to meet the requirement of a specific use case or business model.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE

120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR/5G.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such as CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
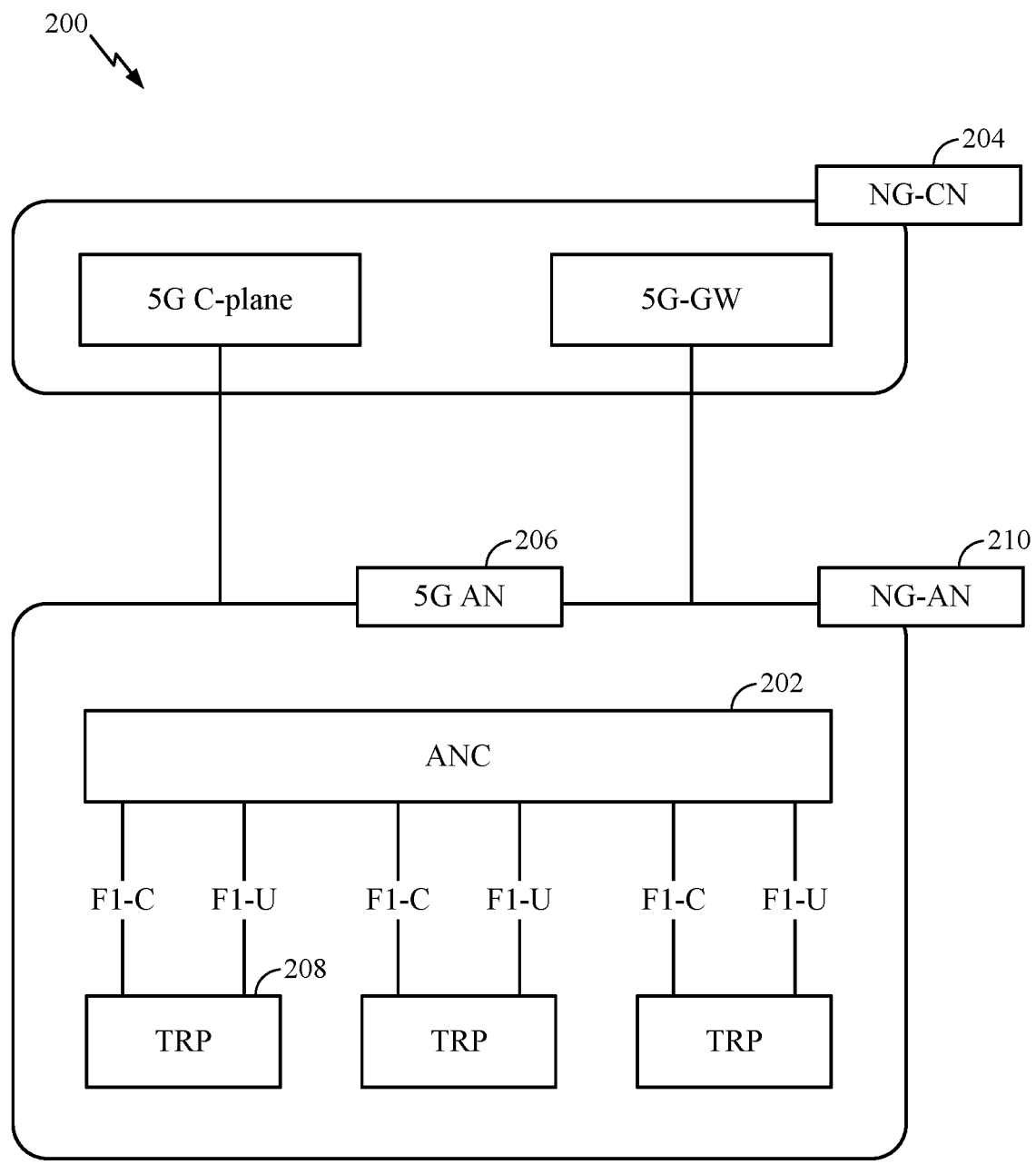
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NB s, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
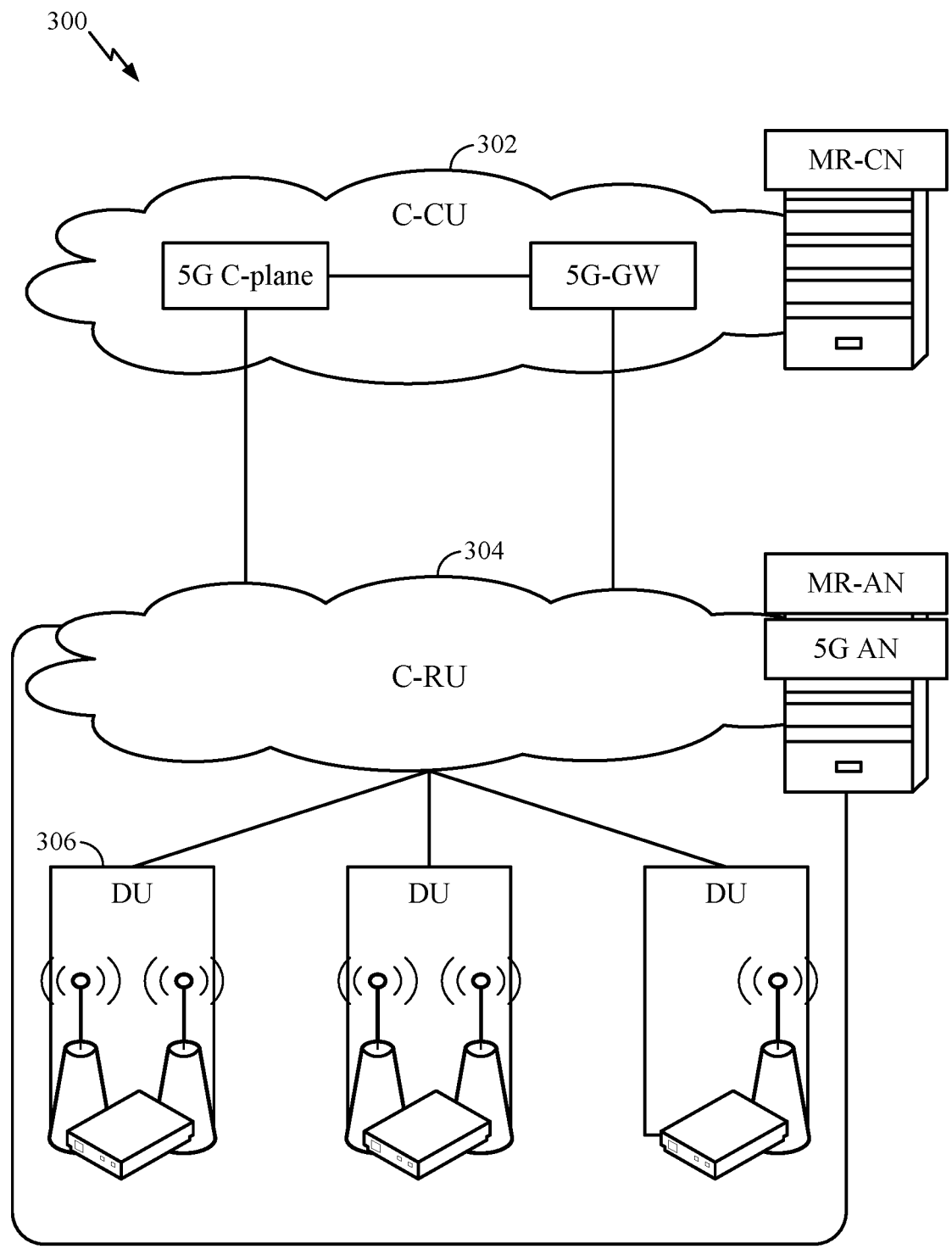
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
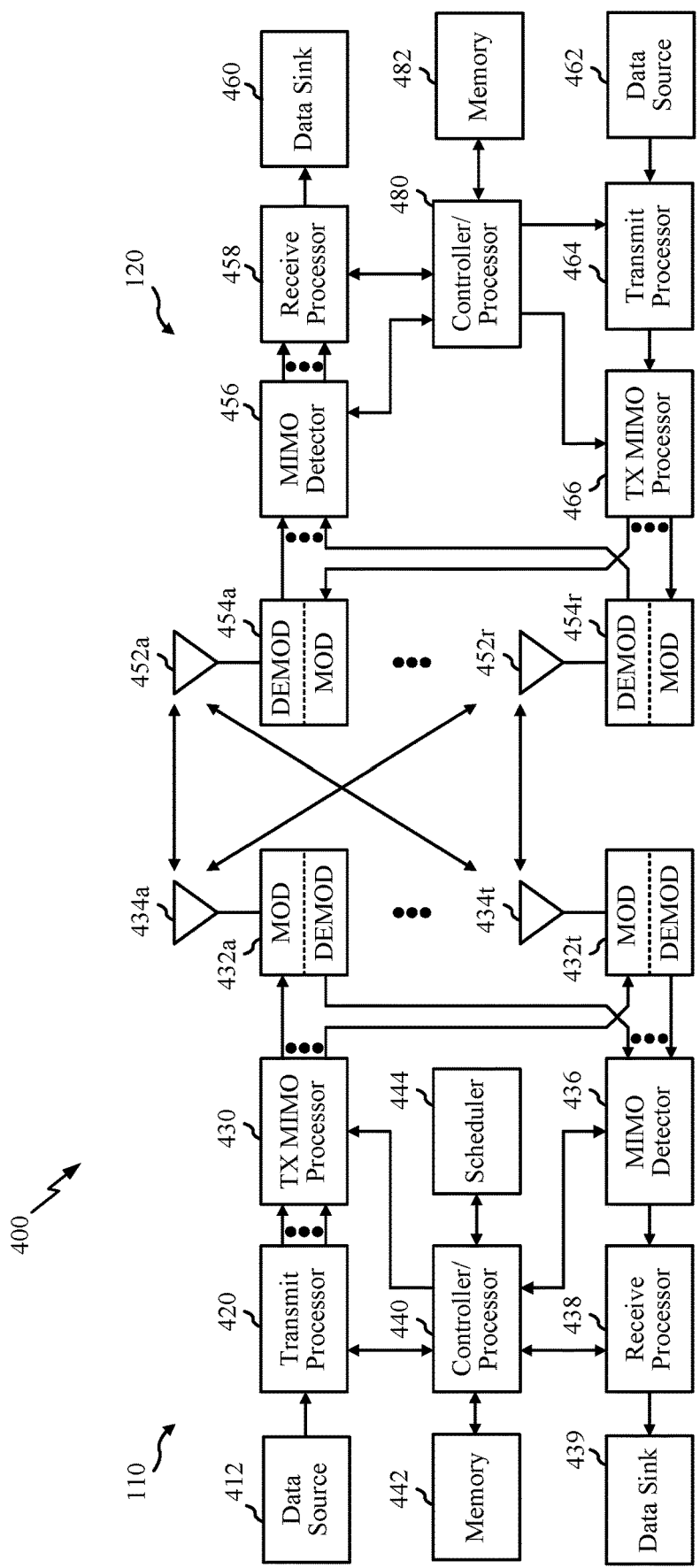
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 440, 420, 438, and/or controller/processor 440 of the BS 110 may be used to perform the operations described herein and illustrated with reference to FIGS. 10-15.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., processes for the techniques described herein. The processor 480 and/or other processors and modules at the UE 120 may also perform or direct, e.g., the execution of the functional blocks illustrated in FIGS. 10, 12-13 and/or 15, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
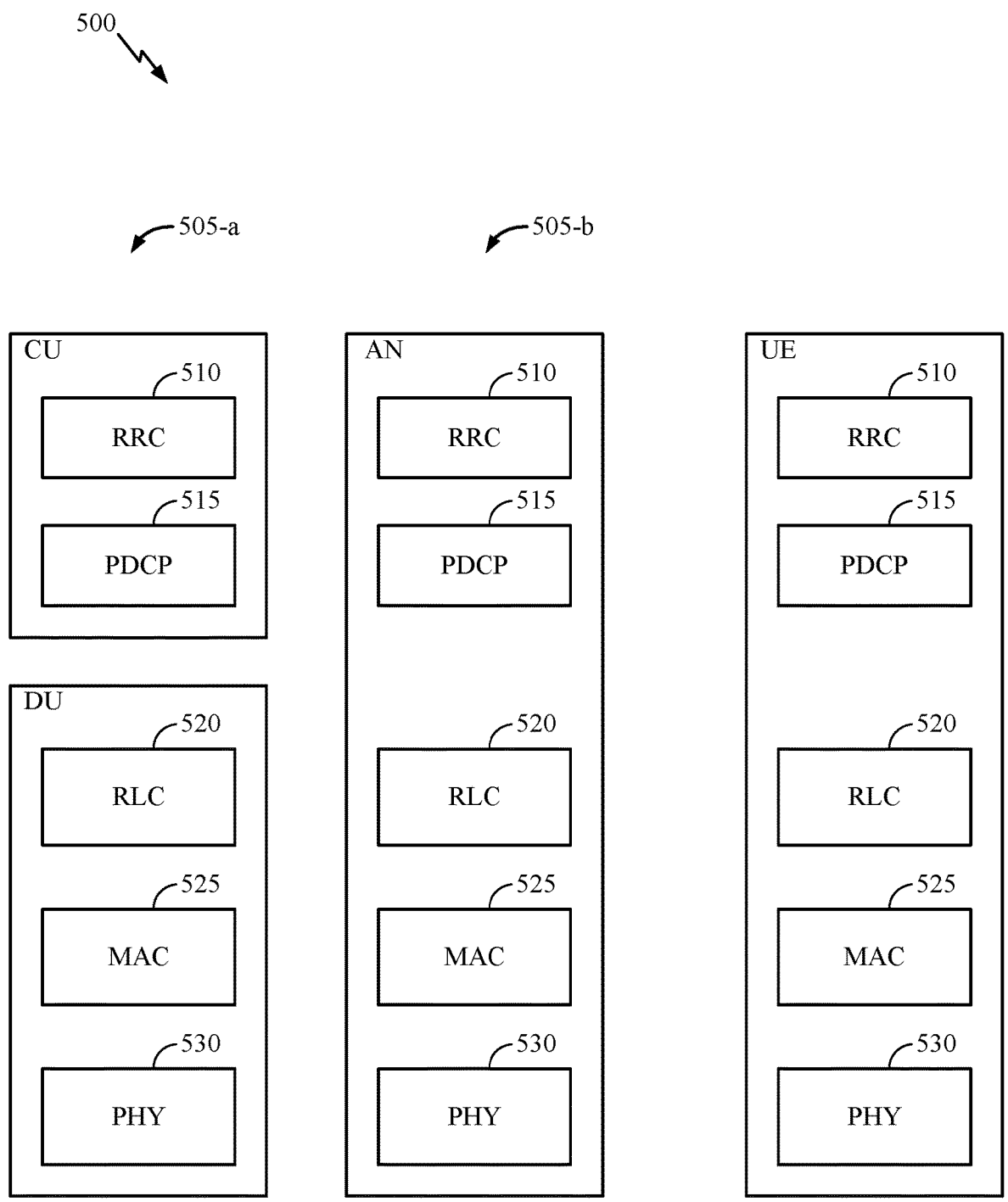
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
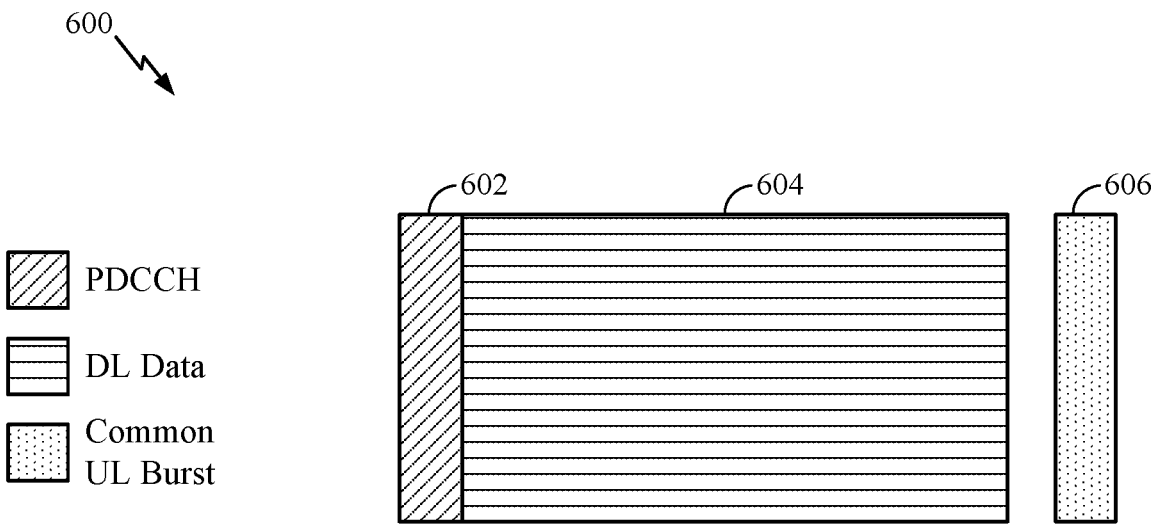
FIG. 6 illustrates an example of a DL-centric subframe, in accordance with certain aspects of the present disclosure.

FIG. 6 is a diagram 600 showing an example of a DL-centric subframe, which may be used to communicate in the wireless network 100. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
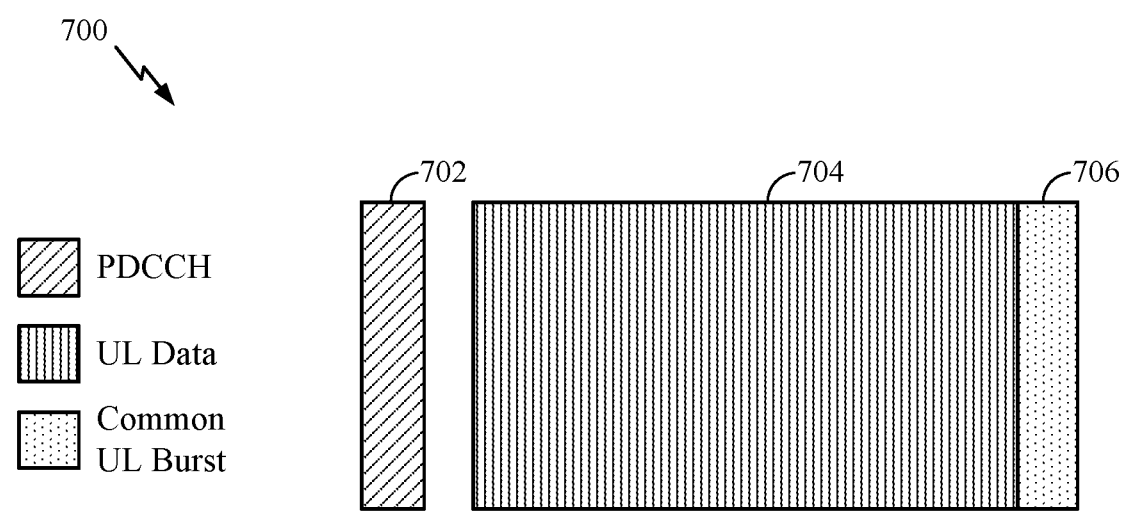
FIG. 7 illustrates an example of an UL-centric subframe, in accordance with certain aspects of the present disclosure.

FIG. 7 is a diagram 700 showing an example of an UL-centric subframe, which may be used to communicate in the wireless network 100. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Incorporation of Network Policies in Key Generation

As noted above, a new air interface is being introduced for 5G, including features that include enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

As the services and technologies for 5G continue to evolve, 5G may be able to support various different deployment scenarios. In the current 5G architecture, for example, one or more network nodes (e.g., security anchor function (SEAF), access and mobility management function (AMF), session management function (SMF), etc.) that are responsible for performing different functions in the network may be collocated or physically separated.

The SEAF was introduced in 5G to keep the security anchor in a physically secure location even if there is a need to move and/or locate the AMF close to the network edge (e.g., RAN). Thus, in some deployments, the SEAF may be collocated with the AMF and, in other deployments, the SEAF may be separated from the AMF (e.g., the SEAF and AMF may each have standalone functions). Similarly, the SMF may be separated from the AMF and the SEAF. In some cases, the SMF may be physically separated from the AMF and may be within a different security domain than the AMF (e.g., in the case of a network sharing scenario). In some cases, the SMF may be slice specific.

Figure 8:
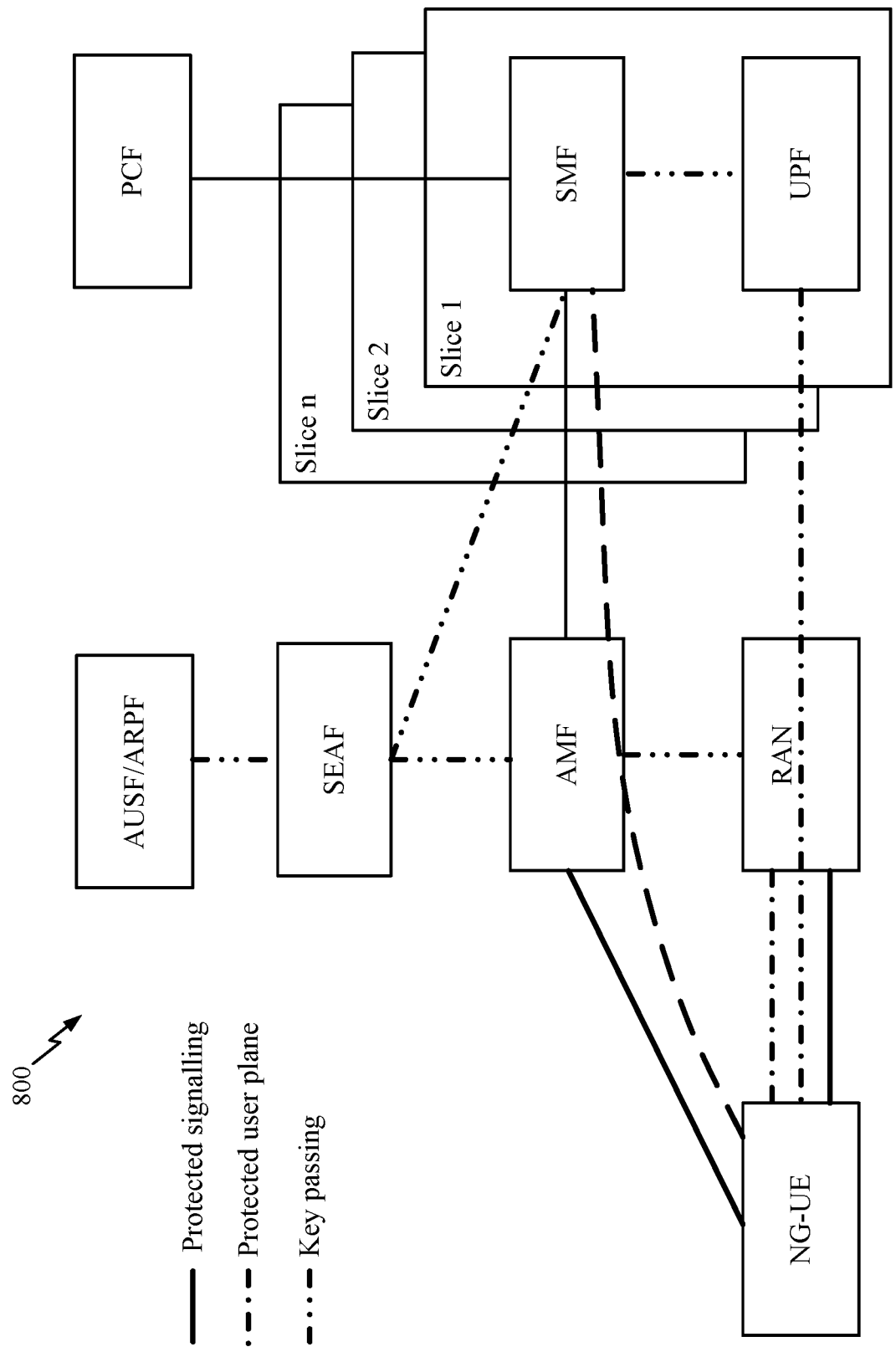
FIG. 8 and FIG. 9 illustrate example 5G architectures with one or more non-collocated network nodes, in accordance with certain aspects of the present disclosure.

FIG. 8 illustrates a reference example of a 5G architecture 800 in which one or more network nodes may be physically separated, according to certain aspects of the present disclosure. In particular, the architecture 800 illustrates a reference example of a deployment scenario where the SEAF is physically separated from the AMF (e.g., as opposed to a collocated SEAF/AMF in other deployment scenarios).

As shown, the 5G architecture 800 may include multiple slices. Each slice may support different services, for example, internet of everything (IoE), URLLC, eMBB, vehicular communications (i.e., V2X such as vehicle-to-vehicle (V2V), vehicle-to-infrastructure (V2I), vehicle-to-pedestrian (V2P), vehicle-to-network (V2N)), etc.

A slice may be defined as a complete logical network that comprises of a set of network functions and corresponding resources necessary to provide certain network capabilities and network characteristics, which may include both 5G-AN and 5G-CN. More specifically, a slice may be the composition of adequately configured network functions, network applications, and underlying cloud infrastructures that are bundled together to meet the requirement of a specific use case or business model. In some cases, different slices may be assigned disjoint resources and may have different requirements, such as latency and/or power.

In this example, the AMF may be configured to serve multiple slices simultaneously. For example, the AMF may provide a mobility management NAS security anchor between the UE and the network slices. The SMF is generally configured to perform service authorization/authentication to support service (slice) specific PDU session establishment. The SMF may also perform functions, such as modify and release, including tunnel(s) maintained between the user plane function (UPF) and RAN. The user plane security can terminate at the UDF. In some cases, the SMF may be able to support a service specific QoS.

Figure 9:
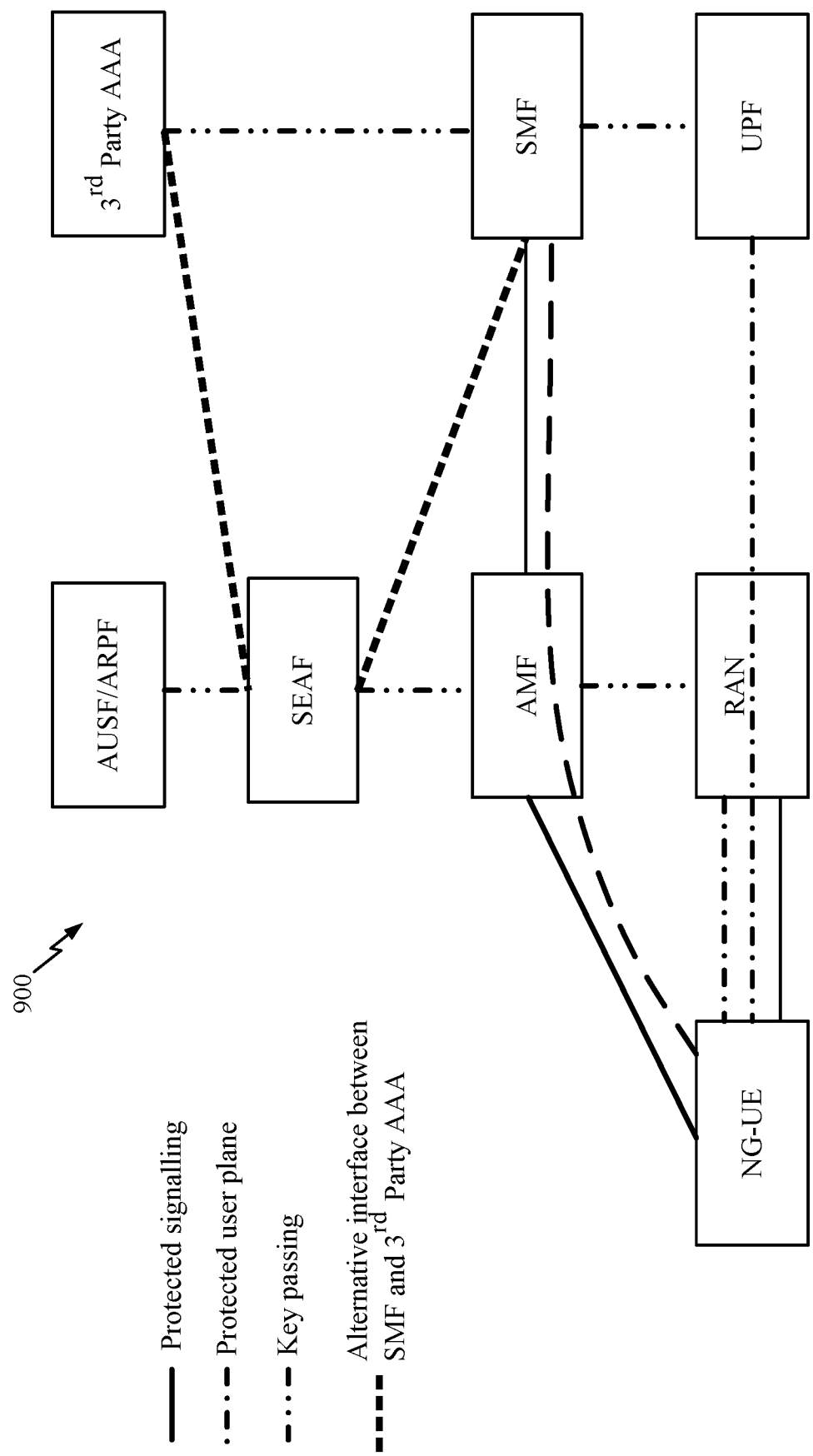

FIG. 9 illustrates another reference example of a 5G architecture 900 in which one or more network nodes (e.g., SEAF, AMF, SMF, etc.) may be physically separated, according to certain aspects of the present disclosure. In some cases, the 5G security architecture may be designed to natively support secondary authentication with a 3 rd party authentication server function (AUSF) (e.g., 3 rd party AAA) for PDU session authorization. The service authentication enables establishment of a service specific PDU session. Similar to FIG. 8, the user plane security can terminate at UPF and a service specific QoS may be supported. The SMF may be able to directly interface to the 3 rd party AAA or interact with the 3 rd party AAA via the SEAF.

As noted, since the 5G network may continue to evolve, it may be desirable to provide the UE with information regarding the particular network configuration, capabilities, security information, etc. (referred collectively herein as network policy information). However, because, in current architectures, the only control-plane interface between the UE and the serving network is N1, which is used for the NAS connection between the UE and the AMF, it may not be possible with the use of current techniques to provide network policy information to the UE in a secure manner.

For example, referring to architecture 800, as the AMF may be the only entity that has a signaling connection with the UE (e.g., based on NAS signaling), the AMF may be able to falsely inform the UE regarding any network security policy information received from another network node (e.g., SEAF, SMF, etc.). Thus, if the network policy information includes information that the AMF and SEAF are separated, current techniques may not be able to securely inform the UE that the AMF and SEAF are separated, because the UE may only have signaling connection with the AMF (e.g., as opposed to also having a signaling connection with the SEAF).

In such cases, a standalone (rogue) AMF may be able to claim that it is collocated with the SEAF, a scenario that cannot be detected by the UE. Such a standalone AMF (rogue) may be able to modify network security capabilities, session management NAS protection, slice specific security capabilities/requirements, etc., in order to compromise the connection/session between the UE and network.

Further, without accurate (secure) network policy information, the UE can be subject to bidding down attacks (e.g., on the PDU session establishment). In one example of a bidding down scenario, the AMF may be in a different security domain than the SMF. For example, in one case, the AMF may be located close to the UE (or RAN) in a serving network (e.g., which may be a less secure location), whereas the SMF may be located deep in the network. In one case, the AMF may be in the serving network (e.g., VPLMN), while the SMF is in the home network.

However, while the AMF may be in a different security domain than the SMF, the SMF may still be responsible for authorizing the slice specific PDU session creation (e.g., based on slice specific subscription information that cannot be accessed by the AMF). The SMF, for example, is typically a logically separate network function from the AMF and is responsible for PDU session authorization and management. As noted above, the SMF may be slice specific and hence may exchange slice specific PDU session parameters with the UE.

However, PDU session parameters, such as Authorized QoS Rule, SSC mode, S-NSSAI, allocated IPv4 address, etc., requested by the UE and configured by the SMF should not be modified by an intermediate node (e.g., including the AMF) between the UE and SMF. Rather, such parameters should be protected by the SMF using a specific key obtained from SEAF and verifiable at the UE by deriving the same SMF key. Thus, in situations in which the AMF is separated from the SEAF, a (malicious or compromised) AMF may modify the session information requested by the UE or authorized by the SMF, e.g., in order to downgrade security, QoS, or other packet treatment.

Accordingly, aspects presented herein provide techniques for securely informing the UE of the network policy information, e.g., to minimize bidding down attacks. Particularly, aspects provide techniques for incorporating the network policy information into the key (e.g., $K_{AMF}$) derivation used for securing the NAS connection between the UE and the AMF. As described below, by incorporating the network policy information into the key derivation, the UE may be able to detect whether any received network policy information from the AMF has been altered/modified/compromised.

Note that while techniques described herein can be used to protect against bidding down attacks of the PDU session establishment, aspects presented herein may also be used to protect against UE policy bidding down by the node(s) between the SEAF and UE. That is, as described below, aspects presented herein may also be used to protect UE policy information (e.g., UE security features and/or UE capabilities, including network capabilities, security capabilities, or any combination thereof), for example, by incorporating the UE policy information into the key (e.g., $K_{AMF}$) derivation. The UE policy information may be provided to the network in registration/attach request message.

According to certain aspects, the $K_{AMF}$ derivation may be used to protect parameter(s) exchanged in the network. In particular, when a UE registers to a network, the SEAF may inform the UE of the network (security) policy information (e.g., network configuration, capabilities, security features, etc.) and/or UE policy information (e.g., received by the UE) by incorporating the network policy information and/or UE policy information in the key (e.g., $K_{AMF}$) derivation.

For example, the SEAF may derive an AMF key (e.g., $K_{AMF}$) based on the network policy information, UE policy information, freshness parameters or any combination thereof, and send the key to the AMF so that the AMF and UE can establish a NAS security context and the SEAF may also inform the UE of the received UE policy information from the UE. The AMF and UE may derive encryption and integrity protection keys from $K_{AMF}$ and protect the NAS messages (e.g., over the N1 interface).

By incorporating the network policy information into the $K_{AMF}$ derivation, the AMF can be prevented from performing unauthorized behaviors, such as bidding down network features by modifying network policy information received from SEAF, as the change in the network policy information results in a different $K_{AMF}$ derivation at the UE. Similarly, by incorporating the UE policy information into the $K_{AMF}$ derivation, the network nodes between the UE and SEAF can be prevented from bidding down the UE capabilities by modifying the UE capabilities, as the change in the UE capabilities will also result in a different $K_{AMF}$ derivation.

Figure 10:
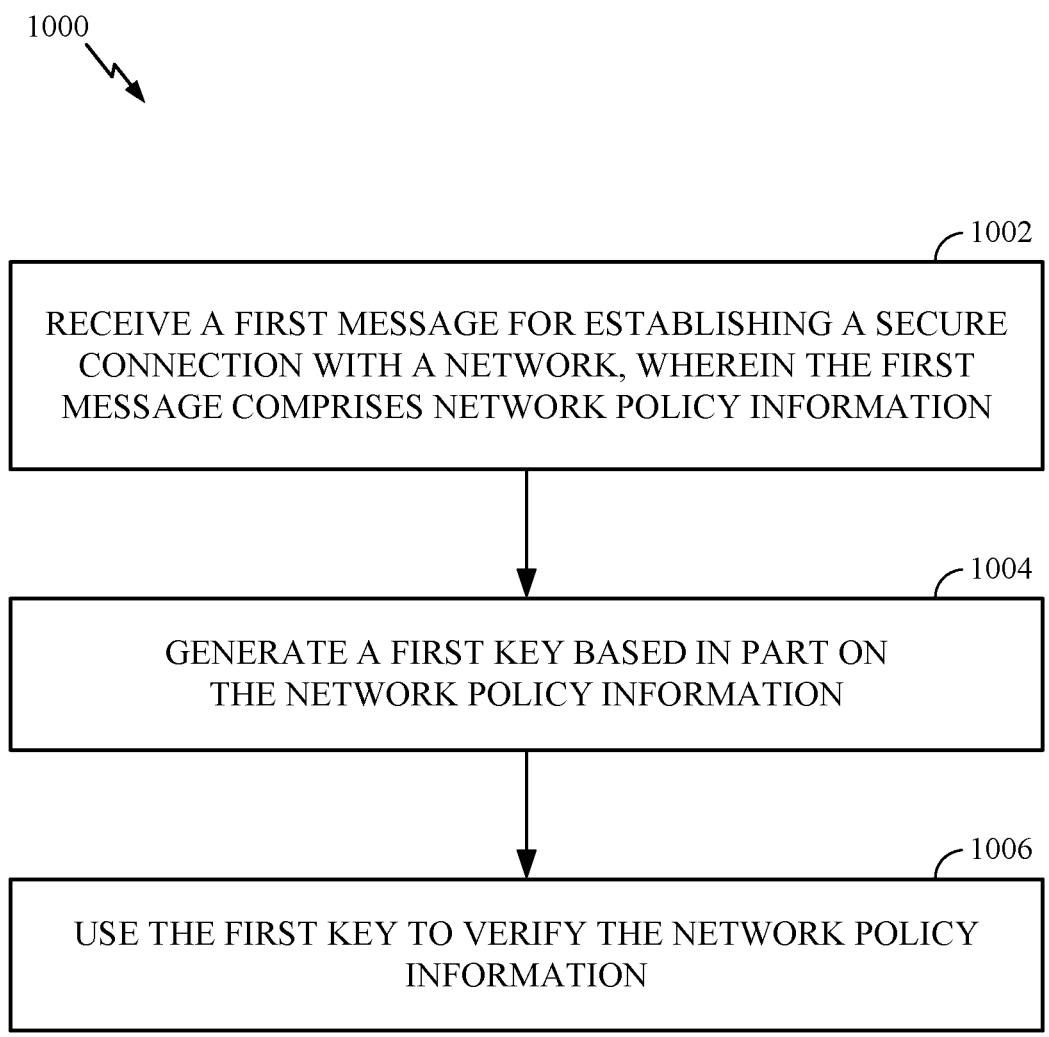
FIG. 10 is a flow diagram illustrating example operations for wireless communications in a network, in accordance with certain aspects of the present disclosure.

FIG. 10 illustrates example operations 1000 for wireless communications. According to certain aspects, operations 1000 may be performed, for example, by a user equipment for establishing a secure (e.g., NAS) connection with a network.

Operations 1000 may begin at 1002 where the UE receives (e.g., from an AMF) a first message (e.g., security mode command (SMC) message) for establishing a secure connection with a network. The first message includes network policy information (e.g., the network configuration, capabilities, security features, etc.). At 1004, the UE generates a first key (e.g., $K_{AMF}$) based in part on the network policy information.

In some aspects, the network policy information includes an indication of whether the UE will receive a session management token, from a SMF in the network, when establishing a communication session with the network. In some aspects, the network policy information comprises an indication of whether the AMF is collocated with the SEAF in the network. In some aspects, the network policy information includes a security level of the AMF. In some aspects, the network policy information includes a security domain of the SEAF, a security domain of the AMF, or any combination thereof. In some aspects, the network policy information may have been formed in response to UE policy information that was sent from the UE to the network. In some aspects, the first key may be determined based on UE policy information that was sent to the network.

At 1006, the UE uses the first key to verify the network policy information is valid. For example, in some cases, the UE may determine whether the first message (containing the network policy information) is valid based in part on the first key.

As described in more detail below, in some cases, the first message may be an SMC message that is integrity protected with a protection key derived based on a second key (e.g., $K_{AMF}$ provided to the AMF from the SEAF). The UE may determine whether the first message (and/or network policy information contained therein) is valid by performing an integrity verification of the first message based on the first key. In one aspect, the UE may determine that the first message is valid if the integrity verification of the first message is correct.

The UE may determine that the integrity verification of the first message is correct if the UE determines that the first key is the same as the second key. The UE may determine that the network policy information is valid based on the determination that the first key is the same as the second key. Likewise, the UE may determine that the first message is invalid if the integrity verification of the first message is incorrect. The UE may determine that the integrity verification of the first message is incorrect if the first key is different from the second key. The UE may determine that the network policy information is invalid based on the determination that the first key is different from the second key.

Figure 11:
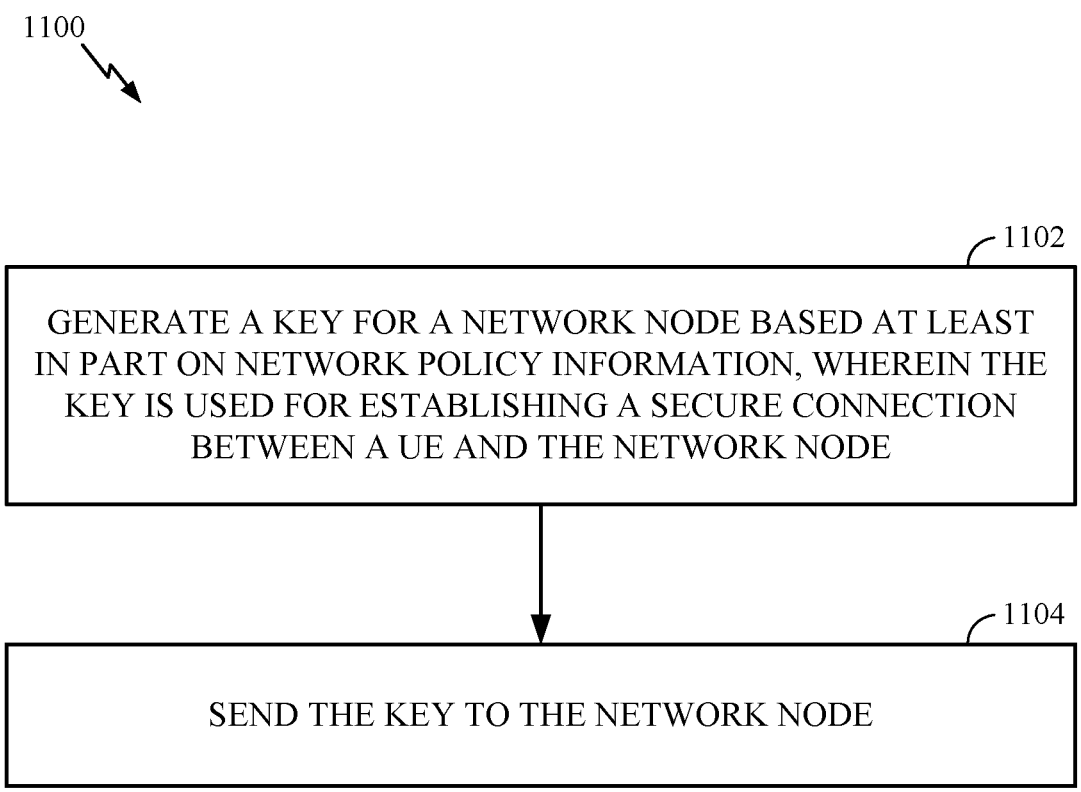
FIG. 11 is a flow diagram illustrating example operations for wireless communications in a network, in accordance with certain aspects of the present disclosure.

FIG. 11 illustrates example operations 1100 for wireless communications. According to certain aspects, operations 1100 may be performed, for example, by a network node (e.g., SEAF) for securely providing network policy information to the UE.

Operations 1100 may begin at 1102 where the network node generates a key (e.g., $K_{AMF}$) for another network node (e.g., AMF) based at least in part on network policy information. As noted, the network policy information may include an indication of whether the other network node (e.g., AMF) is collocated with the network node. In some cases, the network policy information may include at least one of a security level of the network node, or an indication of whether a SMF in the network is to generate a SM token for a communication session between the UE and the network, and send the SM token to the UE. The key is used for establishing a secure connection between the UE and the network node.

In some aspects, the network node may receive a registration message/attach request message that includes UE policy (or capability) information. The network node may incorporate the received UE policy information into the key (e.g., $K_{AMF}$) derivation for the other network node. For example, at 1102 of FIG. 11, the network node may generate the key (e.g., $K_{AMF}$) for the other network node (e.g., AMF) based in part on the network policy information, freshness parameters, UE policy information, or any combination thereof.

At 1104, the network node sends the key to the other network node. In some aspects, the network node may further send at least one of the network policy information or the amount of time that the network policy information is valid to the network node.

Figure 12:
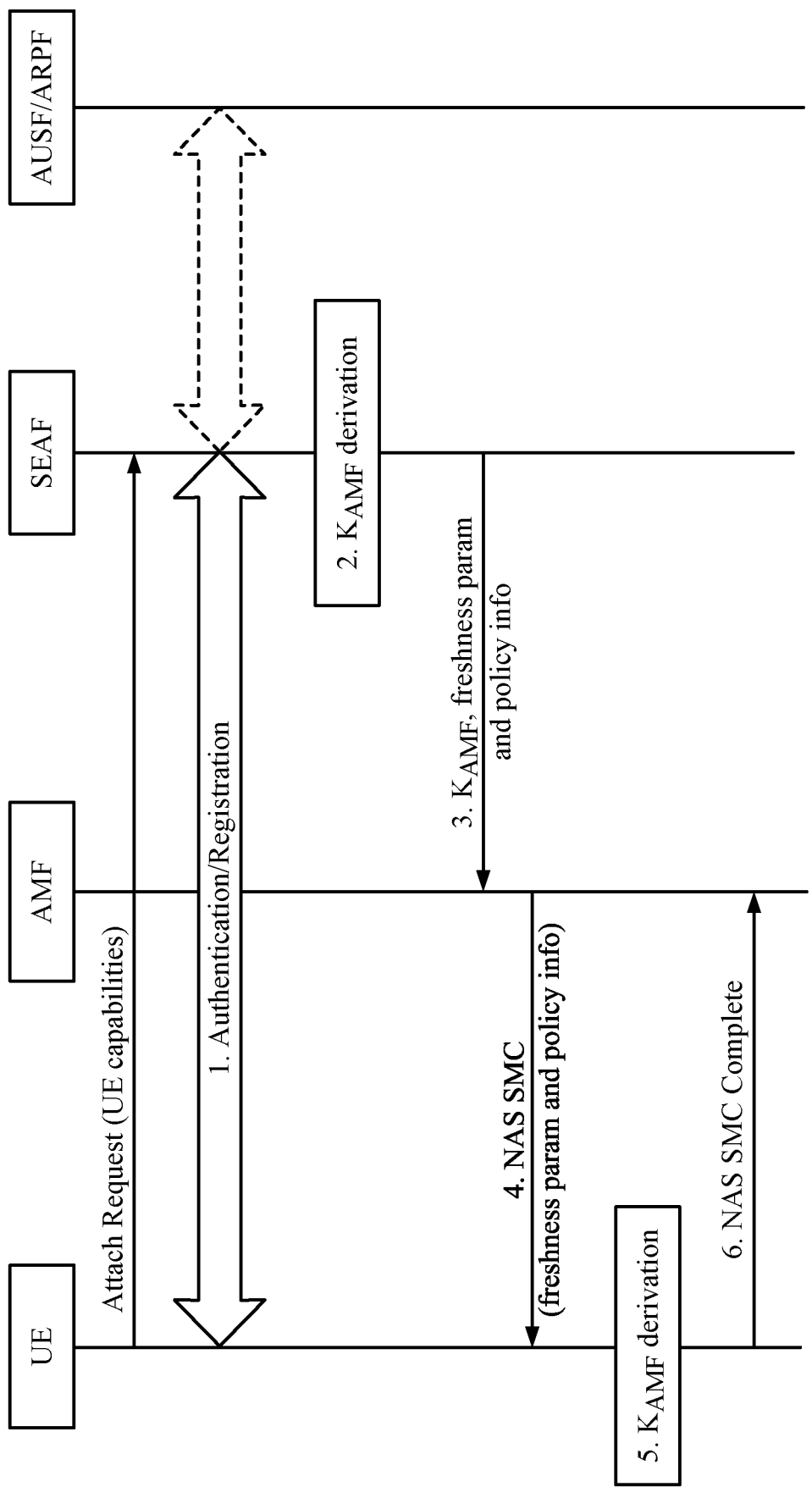
FIG. 12 is a call-flow diagram illustrating an example registration procedure, in accordance with certain aspects of the present disclosure.

FIG. 12 is a call-flow diagram illustrating an example registration procedure that allows the SEAF to securely inform the UE of the network (security) policy information and/or UE policy information (e.g., by incorporating the policy information and/or UE policy information in key derivation), in accordance with certain aspects of the present disclosure.

In some aspects, as shown, the UE may initially send a registration request/attach request to the network (e.g., AMF, SEAF, etc.). The registration request/attach request includes the UE policy (capabilities). Then, at step 1, the UE performs an authentication/registration procedure with the network. The UE and SEAF may establish a shared anchor key ($K_{SEAF}$) based on a new authentication or based on a prior authentication. During the registration, the AMF may request a key ($K_{AMF}$) from the SEAF.

At step 2, the SEAF generates (e.g., derives), for the AMF, a $K_{AMF}$ for registering the UE to the network. The $K_{AMF}$ derivation incorporates the network policy information (e.g., the network configuration, capabilities, security features, etc.) and/or UE policy information. In one aspect, the network policy information may include the AMF type, e.g., collocated AMF/SEAF, standalone AMF, etc.

For example, the network policy information may include one or more SEAF/AMF separation bits. If the AMF requesting the $K_{AMF}$ is a standalone AMF separated from the SEAF, the SEAF may set the SEAF/AMF separation bit(s) to a first value (e.g., 1). If the AMF requesting the $K_{AMF}$ is a collocated AMF/SEAF, the SEAF may set the SEAF/AMF separation bit(s) to a different second value (e.g., 0). In one aspect, the $K_{AMF}$ derivation may also incorporate one or more freshness parameters used to prevent replay attacks. Examples of such freshness parameters may include counter(s) (maintained both at the UE and SEAF), random values exchanged between the UE and SEAF, or any combination thereof. In one aspect, the SEAF may use the following equation (1) to generate (derive) $K_{AMF}$:

$$K_{AMF} = KDF(K_{SEAF}, \text{freshness parameter(s)}, \text{network policy information}, \text{UE policy}) \quad (1)$$

where KDF is a key derivation function (e.g., HMAC-SHA-1, HMAC-SHA-256, HMAC-SHA-512, PRF-X (pseudo random function whose output size is X)), $K_{SEAF}$ is the anchor protection key in the serving network (and kept at the SEAF), freshness parameters are the counter(s), random value(s) used to prevent replay attacks, the network policy information includes the network configuration, capabilities, security features, etc., and the UE policy includes at least one of UE capability information and/or UE security information.

At step 3, the SEAF provides the $K_{AMF}$, freshness parameter(s) and network policy information to the AMF. In some aspects, the SEAF may also provide (e.g., repeat) the UE policy at step 3 to the AMF. At step 4, the AMF sends a NAS security mode command (SMC) to the UE. In some aspects, the AMF may also provide (e.g., repeat) the UE policy at step 4 to the UE. The NAS SMC may include the freshness parameter(s) and network policy information obtained from the SEAF, and the NAS SMC may be integrity protected based on $K_{AMF}$. For example, upon receiving the $K_{AMF}$ from SEAF, the AMF may derive a NAS integrity protection key (e.g., $K_{NASINT}$) based on K_AMF and use $K_{NASINT}$ to integrity protect the NAS SMC message.

At step 5, the UE generates (e.g., derives) a $K_{AMF}$ using the $K_{SEAF}$, and the information (e.g., freshness parameter(s), network policy information, etc.) in the NAS SMC message, and verifies the NAS SMC message. That is, the UE can detect whether there have been any changes (e.g., by the AMF) to the network policy information, since any changes in the network policy information will lead to a different $K_{AMF}$ derivation at the UE. The UE can detect such changes when the UE checks the integrity protection of the NAS SMC using by comparing the $K_{AMF}$ generated by the UE with the integrity protection of the NAS SMC using $K_{AMF}$. Thus, a determination that the integrity verification of SMC is correct implies that the $K_{AMF}$ generated by the UE and the $K_{AMF}$ provided to the AMF (from SEAF) are the same, which in turn implies that the network policy information provided to the UE (from AMF) is valid.

Assuming the verification of SMC is correct, the UE (at step 6) sends a NAS security mode complete message to the AMF. In some aspects, the UE can also detect whether UE policy information (provided to the network) has been modified by any of the intermediate network nodes. That is, in some aspects, the UE may generate $K_{AMF}$ based on the UE policy information (e.g., in addition to or alternatively to network policy information) to determine if the UE policy information has been modified (e.g., based on whether the $K_{AMF}$ generated by the UE and the $K_{AMF}$ provided to the AMF (from SEAF) are the same).

Note that while the call flow in FIG. 12 describes incorporating network policy information into key derivation in order to securely inform the UE of the network policy information, the techniques presented herein can also be used to protect UE security features. That is, in addition to or in the alternative to network policy information, the key ($K_{AMF}$) derivation may incorporate the UE capabilities (including UE security features), where the UE capabilities are provided to the network in a registration/attach request message.

The techniques described in FIGS. 10-12 may be used to prevent the AMF from modifying any network capability parameters that it relays to the UE by restricting the key usage in key derivation. However, while these techniques may be useful for preventing bidding down of network capabilities, such techniques may not be sufficient for preventing the PDU session parameter(s) bidding down (e.g., SM NAS token).

Accordingly, aspects presented herein provide techniques that can be used to prevent bidding down attacks (e.g., on the PDU session establishment and/or the network capability parameters).

More specifically, when a UE registers to the network, the SEAF provides the network policy information (e.g., network configuration, (security) capabilities, etc.) and the integrity protected network policy information (e.g., network policy token) along with the $K_{AMF}$ to the AMF. The network policy information is integrity protected using $K_{SEAF}$. The network policy token is piggybacked on the NAS security mode command and provided to the UE. The network policy token prevents any network functions sitting between the SEAF and UE from modifying the network capabilities.

Figure 13:
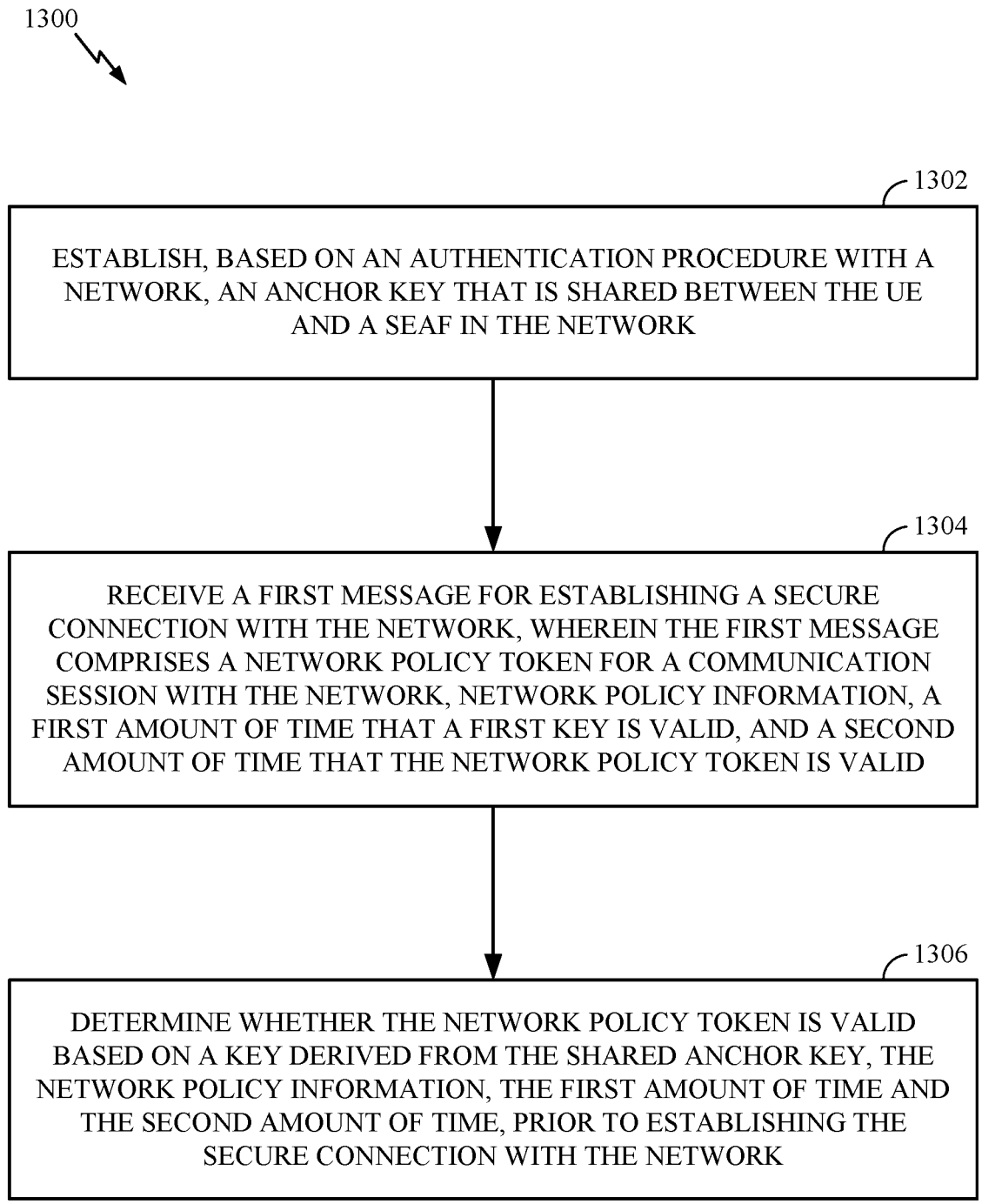
FIG. 13 is a flow diagram illustrating example operations for wireless communications in a network, in accordance with certain aspects of the present disclosure.

FIG. 13 illustrates example operations 1300 for wireless communications. According to certain aspects, operations 1300 may be performed, for example, by a user equipment for establishing a secure (e.g., NAS) connection with a network.

Operations 1300 may begin at 1302 where the UE establishes, based on an authentication procedure with a network, an anchor key (e.g., $K_{SEAF}$) that is shared between the UE and a SEAF in the network. At 1304, the UE receives a first message (e.g., SMC message) for establishing a secure connection with the network. The first message includes a network policy token for a communication session with the network, network policy information, a first amount of time that the network policy information is valid and a second amount of time that a first key used for the secure connection is valid. The network policy token includes integrity protection information associated with the network policy information.

At 1306, the UE determines whether the network policy token is valid based on a key derived from the shared anchor key, the network policy information, the first amount of time and the second amount of time, prior to establishing the secure connection with the network. In some aspects, determining whether the network policy token is valid includes verifying the integrity protection information based on the key derived from the shared anchor key. In some aspects, the UE may send UE policy information (e.g., UE capability information, UE security information, etc.) to the network. The UE may generate a key based on the UE policy information sent to the network. In some cases, the network policy information may be based on the UE policy information.

Figure 14:
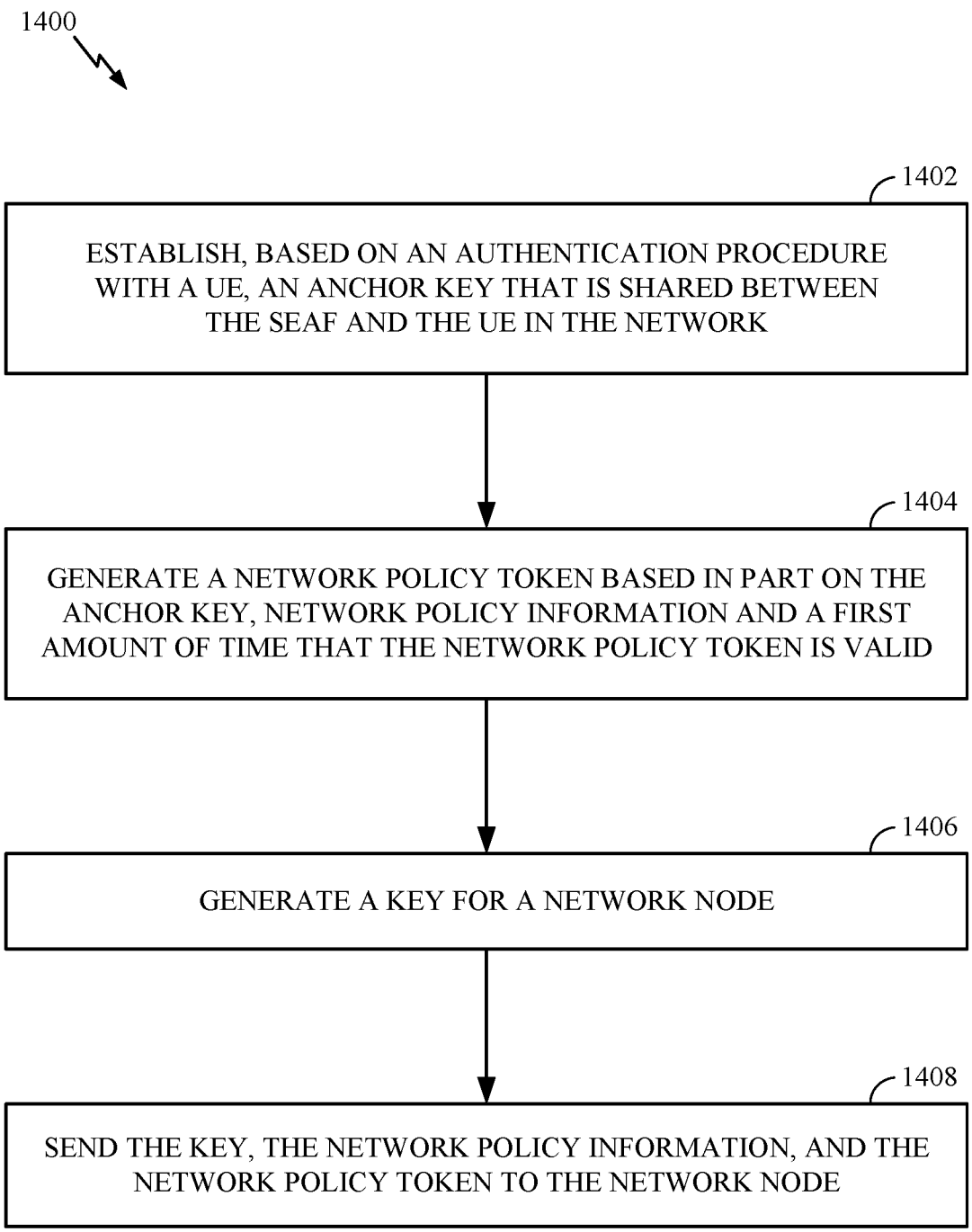
FIG. 14 is a flow diagram illustrating example operations for wireless communications in a network, in accordance with certain aspects of the present disclosure.

FIG. 14 illustrates example operations 1400 for wireless communications. According to certain aspects, operations 1400 may be performed, for example, by a network node (e.g., SEAF) for securely providing network policy information to the UE.

Operations 1400 may begin at 1402 where the network node establishes, based on an authentication procedure with a UE, an anchor key (e.g., $K_{SEAF}$) that is shared between the network node and the UE in the network. At 1404, the network node generates a network policy token (e.g., K to k en) based in part on the anchor key, network policy information, and a first amount of time that the network policy token is valid. The network policy token includes integrity protection information associated with the network policy information. At 1406, the network node generates a key (e.g., $K_{AMF}$) for another network node (e.g., AMF). At 1408, the network node sends the key, the network policy information and the network policy token to the other network node.

In some aspects, as described above, the network node may incorporate UE policy information into the key (e.g., $K_{AMF}$) derviation, e.g., to prevent intermediate nodes from modifying the UE policy information received from the UE. As noted, the network node may receive the UE policy information via a registration/attach request message.

Figure 15:
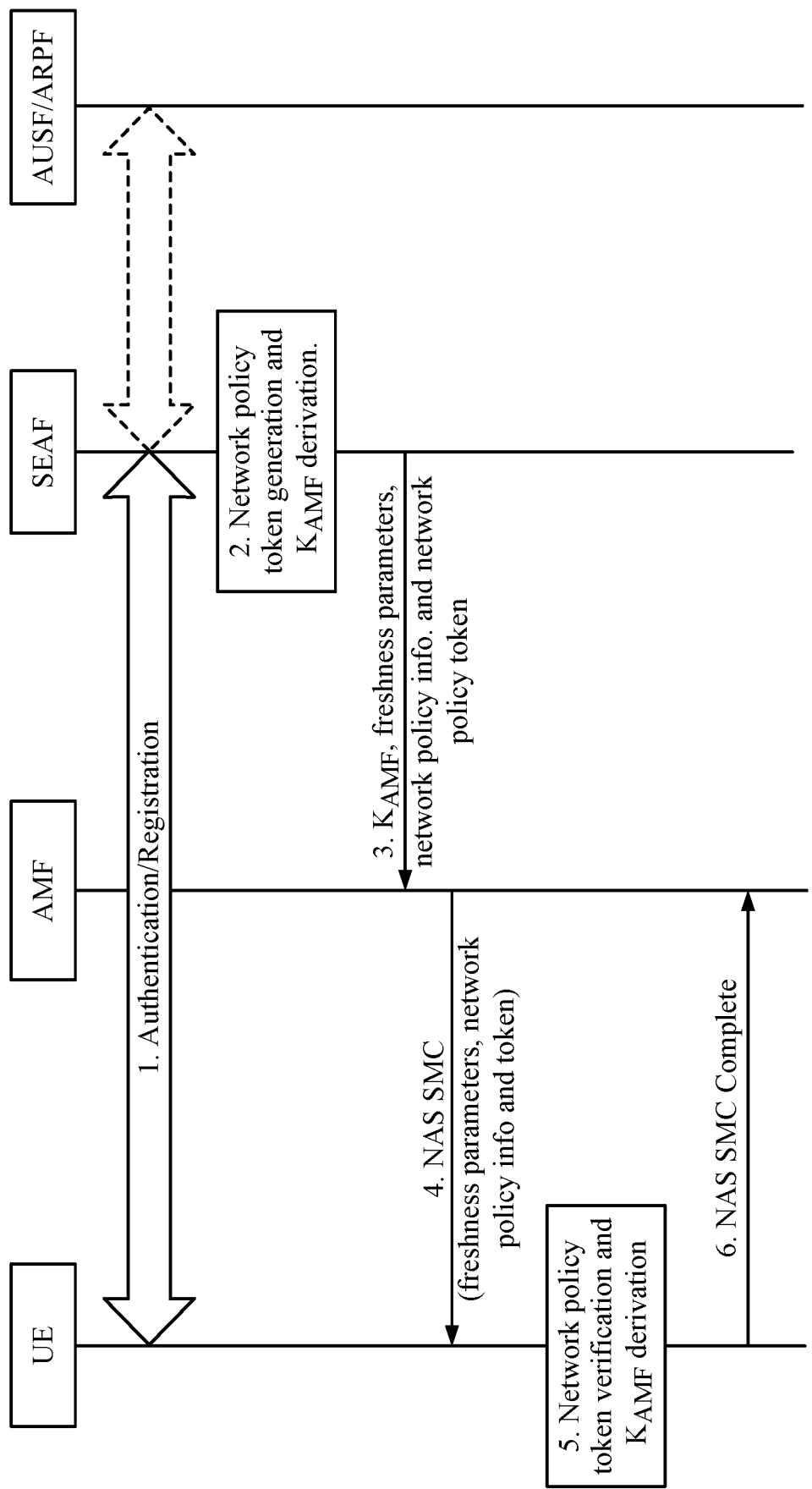
FIG. 15 is a call-flow diagram illustrating an example registration procedure, in accordance with certain aspects of the present disclosure.

FIG. 15 is a call-flow diagram illustrating an example registration procedure that allows the SEAF to prevent bidding down attacks on the PDU session establishment, in accordance with certain aspects of the present disclosure.

As shown, at step 1, the UE performs a registration procedure with the network. The UE and SEAF may establish a shared anchor key ($K_{SEAF}$) based on a new authentication or based on a previous authentication. During the registration, the AMF may request a key ($K_{AMF}$) from the SEAF. Although not shown, in some cases, the UE may provide UE policy information (e.g., UE capability information, UE security information, etc.) to the network via a registration/attach request message.

At step 2, the SEAF generates, for the AMF, a $K_{AMF}$ for registering the UE to the network. The SEAF may generate the $K_{AMF}$ using $K_{SEAF}$ and one or more first freshness parameters. Additionally, the SEAF generates a network policy token using $K_{SEAF}$, one or more second freshness parameters (e.g., to prevent replay attacks), and the network policy information. As noted, the network policy token is a message authentication code (or integrity protection information) of the network policy information. Similar to FIG. 12, the network policy information may include one or more SEAF/AMF separation bits. In some aspects, the SEAF may generate the $K_{AMF}$ further based on the UE policy information.

At step 3, the SEAF provides the $K_{AMF}$, first and second freshness parameter(s), network policy token and network policy information to the AMF. At step 4, the AMF sends a NAS security mode command to the UE. The NAS security mode command includes the network policy information, the first and second freshness parameters and network policy token obtained from the SEAF.

At step 5, the UE performs a verification procedure on the network policy token using $K_{SEAF}$. If the verification is successful, then the UE derives a $K_{AMF}$ using the $K_{SEAF}$, and performs a verification procedure on the NAS security mode command using the derived $K_{AMF}$. Assuming that the NAS security mode command is verified, the UE (at step 6) sends a NAS security mode complete message to the AMF. In this manner, the SEAF can indicate the network capabilities directly to the UE in a secure manner (as the token is generated and verified based on the key between the UE and SEAF).

Note that, in some aspects, the SEAF (for FIG. 15) may have to maintain an additional state (e.g., freshness parameter) (compared to the SEAF in FIG. 12) of the UE for the network policy generation to prevent replay attacks. This may be similar to maintaining a connection state between the UE and the SEAF, a connection that may be may be prone to desyncing. Further, note that techniques similar to the techniques described in FIGS. 13-15 may also be used to protect bidding down attacks on UE policy information (including UE security information and/or UE capability information).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for receiving, means for determining, means for performing, means for participating, means for indicating, means for establishing, means for verifying, means for sending, means for communicating, means for storing, means for entering, means for protecting, means for preventing, means for exiting, means for generating, means for forwarding, and/or means for providing may comprise one or more processors or antennas at the BS 110 or UE 120, such as the transmit processor 420, controller/processor 440, receive processor 438, or antennas 434 at the BS 110 and/or the transmit processor 464, controller/processor 480, receive processor 458, or antennas 452 at the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
  receiving network policy information from a network, wherein the network policy information comprises security features of the network;
  generating an access and mobility management function (AMF) key by a key derivation function (KDF), wherein a security anchor function (SEAF) key and the network policy information are inputs into the KDF;
  generating an integrity protection key based at least in part on the AMF key; and
  verifying an integrity of the network policy information using the integrity protection key.

2. The method of claim 1, wherein receiving network policy information comprises receiving a non-access stratum (NAS) message comprising the network policy information.

3. The method of claim 2, wherein verifying the integrity of the network policy information comprises verifying an integrity of the NAS message using the integrity protection key.

4. The method of claim 3, further comprising establishing a secure connection with the network if the integrity of the NAS message is verified.

5. The method of claim 1, further comprising performing at least one of an authentication or registration procedure with the SEAF, prior to receiving the network policy information, wherein the SEAF key is established based on at least one of the authentication or registration procedure.

6. The method of claim 1, wherein:
the network policy information is received from an access and mobility management function (AMF) in the network; and
the method further comprises establishing a secure connection with the network by sending a message to the AMF.

7. The method of claim 6, wherein the message is a SMC complete message.

8. The method of claim 1, further comprising sending UE policy information to the network, wherein the UE policy information comprises at least one of UE capability information or UE security information.

9. The method of claim 8, wherein generating the AMF key is based on the UE policy information sent to the network.

10. A method for wireless communication by a security anchor function (SEAF), comprising:
generating an access and mobility management function (AMF) key for an AMF node in a network by inputting a SEAF key and network policy information into a key derivation function (KDF), wherein the network policy information comprises security features of the network; and
sending the AMF key to the AMF node.

11. The method of claim 10, further comprising participating in at least one of an authentication procedure or registration procedure with a UE prior to generating the AMF key, wherein the SEAF is established based on at least one of the authentication procedure or the registration procedure.

12. The method of claim 10, further comprising sending the network policy information to the AMF node.

13. The method of claim 10, further comprising receiving user equipment (UE) policy information of a UE, wherein the UE policy information comprises at least one of UE capability information or UE security information.

14. The method of claim 13, wherein the AMF key is generated further based on the UE policy information.

15. An apparatus for wireless communication by a user equipment (UE), comprising:
one or more processors individually or collectively configured to execute instructions stored on one or more processors and to cause the UE to:
receive network policy information from a network, wherein the network policy information comprises security features of the network;
generate an access and mobility management function (AMF) key by a key derivation function (KDF), wherein a security anchor function (SEAF) key and the network policy information are inputs into the KDF;
generate an integrity protection key based at least in part on the AMF key; and
verify an integrity of the network policy information using the integrity protection key.

16. The apparatus of claim 15, wherein the one or more processors are further configured to cause the UE to receive the network policy information in a non-access stratum (NAS) message.

17. The apparatus of claim 16, wherein, in order to verify the integrity of the network policy information, the one or more processors are further configured to cause the UE to verify an integrity of the NAS message using the integrity protection key.

18. The apparatus of claim 17, wherein the one or more processors are further configured to cause the UE to establish a secure connection with the network if the integrity of the NAS message is verified.

19. The apparatus of claim 15, wherein the one or more processors are further configured to cause the UE to perform at least one of an authentication or registration procedure with the SEAF, prior to receiving the network policy information, wherein the SEAF key is established based on at least one of the authentication or registration procedure.

20. The apparatus of claim 15, wherein the one or more processors are further configured to cause the UE to:
receive the network policy information from an access and mobility management function (AMF) in the network; and
establish a secure connection with the network by sending a message to the AMF.

21. The apparatus of claim 20, wherein the message is a SMC complete message.

22. The apparatus of claim 15, wherein the one or more processors are further configured to cause the UE to send UE policy information to the network, wherein the UE policy information comprises at least one of UE capability information or UE security information.

23. The apparatus of claim 22, wherein the one or more processors are further configured to cause the UE to generate the AMF key based on the UE policy information sent to the network.

24. An apparatus for wireless communication by a security anchor function (SEAF), comprising:
one or more processors individually or collectively configured to execute instructions stored on one or more processors and to cause the SEAF to:
generate an access and mobility management function (AMF) key for an AMF node in a network by inputting a SEAF key and network policy information into a key derivation function (KDF), wherein the network policy information comprises security features of the network; and
send the AMF key to the AMF node.

25. The apparatus of claim 24, wherein the one or more processors are further configured to cause the SEAF to participate in at least one of an authentication procedure or registration procedure with a UE prior to generating the AMF key, wherein the SEAF is established based on at least one of the authentication procedure or the registration procedure.

26. The apparatus of claim 24, wherein the one or more processors are further configured to cause the SEAF to send the network policy information to the AMF node.

27. The apparatus of claim 24, wherein the one or more processors are further configured to cause the SEAF to receive user equipment (UE) policy information of a UE, wherein the UE policy information comprises at least one of UE capability information or UE security information.

28. The apparatus of claim 27, wherein the AMF key is generated further based on the UE policy information.

\* \* \* \* \*